United States Patent
Song et al.

(10) Patent No.: US 9,841,640 B2
(45) Date of Patent: Dec. 12, 2017

(54) PIXEL UNIT ARRAY AND LIQUID CRYSTAL DISPLAY DEVICE

(71) Applicants: Xiamen Tianma Micro-electronics Co., Ltd., Xiamen (CN); Tianma Micro-electronics Co., Ltd., Shenzhen (CN)

(72) Inventors: Qiong Song, Xiamen (CN); Poping Shen, Xiamen (CN); Ling Wu, Xiamen (CN); Rong Chen, Xiamen (CN); Ankai Ling, Xiamen (CN)

(73) Assignees: XIAMEN TIANMA MICRO-ELECTORNICS CO., LTD., Xiamen (CN); TIANMA MICRO-ELECTRONICS CO., LTD., Shenzhen (CN)

(*) Notice: Subject to any disclaimer, the term of this patent is extended or adjusted under 35 U.S.C. 154(b) by 42 days.

(21) Appl. No.: 14/992,686

(22) Filed: Jan. 11, 2016

(65) Prior Publication Data
US 2016/0327839 A1 Nov. 10, 2016

(30) Foreign Application Priority Data
May 7, 2015 (CN) .......................... 2015 1 0228848

(51) Int. Cl.
G02F 1/1343 (2006.01)
G02F 1/1333 (2006.01)
G02F 1/1335 (2006.01)
G02F 1/1368 (2006.01)

(52) U.S. Cl.
CPC .................. *G02F 1/134309* (2013.01); *G02F 2001/134372* (2013.01)

(58) Field of Classification Search
CPC ............... G02F 1/134309; G02F 2001/134372
See application file for complete search history.

(56) References Cited

U.S. PATENT DOCUMENTS

| 6,115,087 A * | 9/2000 | Ohi ................... G02F 1/134336 349/128 |
| 6,222,599 B1 * | 4/2001 | Yoshida ............ G02F 1/134363 349/106 |
| 6,466,291 B1 * | 10/2002 | Ham ................. G02F 1/134363 349/129 |

(Continued)

FOREIGN PATENT DOCUMENTS

| CN | 1766702 A | 5/2006 |
| CN | 1287211 C | 11/2006 |

(Continued)

*Primary Examiner* — Ryan Crockett
(74) *Attorney, Agent, or Firm* — Anova Law Group, PLLC

(57) ABSTRACT

A pixel unit array is provide. The pixel unit array comprises a plurality of pixel units including a plurality of first pixel units and a plurality of second pixel units alternately arranged in a pixel direction. Each pixel unit comprises a first electrode, a second electrode and an insulating layer between the first electrode and the second electrode. The second electrode further includes a first part and a second part connected to the first part. The first part includes an N number of first stripe-shaped electrodes, and the second part includes an M number of second stripe-shaped electrodes. The first part in the second electrode has a width of a1, the second part in the second electrode has a width of a2, and a1<a2.

18 Claims, 13 Drawing Sheets

(56) References Cited

U.S. PATENT DOCUMENTS

| | | | | |
|---|---|---|---|---|
| 6,801,287 | B2* | 10/2004 | Kurahashi | G02F 1/134363 349/141 |
| 7,843,541 | B2* | 11/2010 | Haruyama | G02F 1/133555 349/114 |
| 8,253,884 | B2* | 8/2012 | Miyachi | C09K 19/18 349/132 |
| 2002/0012077 | A1* | 1/2002 | Fukami | G02F 1/134363 349/38 |
| 2004/0004689 | A1* | 1/2004 | Song | G02F 1/1393 349/141 |
| 2005/0093805 | A1* | 5/2005 | Hong | G02F 1/134363 345/94 |
| 2009/0096943 | A1* | 4/2009 | Uehara | G02B 27/2214 349/37 |
| 2009/0284693 | A1* | 11/2009 | Adachi | G02F 1/133555 349/98 |
| 2012/0113375 | A1 | 5/2012 | Na et al. | |
| 2015/0137130 | A1* | 5/2015 | Wang | G02F 1/134336 257/72 |
| 2017/0278467 | A1* | 9/2017 | Huang | G02F 1/133707 |

FOREIGN PATENT DOCUMENTS

| | | |
|---|---|---|
| CN | 103185992 A | 7/2013 |
| CN | 103941498 A | 7/2014 |
| KR | 100958036 B1 | 5/2010 |

\* cited by examiner

PIXEL UNIT ARRAY AND LIQUID CRYSTAL DISPLAY DEVICE

CROSS-REFERENCES TO RELATED APPLICATIONS

This application claims the priority of Chinese patent application No. CN201510228848.4, filed on May 7, 2015, the entire content of which is incorporated herein by reference.

FIELD OF THE DISCLOSURE

The present disclosure relates to the field of flat panel display technology and, more particularly, relates to a pixel unit array and corresponding liquid crystal display devices.

BACKGROUND

In recent years, flat panel displays have been popular in a variety of fields because of their light weight and high energy efficiency, and liquid crystal displays (LCDs) are the most common among them. According to the operating modes of the liquid crystals, LCD panels mainly include the following types: a Twisted Nematic (TN) type, an In-plane Switching (IPS) type, and a Fringe Field Switching (FFS) type, etc.

When a horizontal electric field is used to drive both the FFS type and the IPS type, the FFS type has been proven to achieve high resolution and wide viewing angles in LCDs, and performs better than the IPS type. This is because the FFS type can freely include an even or odd number of liquid crystal domains, which breaks the limitation of even number of liquid crystal domains in the IPS type and enables high quality images in high resolution LCDs.

FIG. 1 illustrates a top view of pixel units in a conventional FFS mode LCD panel. The FFS mode LCD panel includes a plurality of scanning lines 101, a plurality of data lines 102, and a plurality of pixel units confined by the adjacent scanning lines 101 and data lines 102. The pixel units include common electrodes 104 and pixel electrodes 105 disposed on top of the common electrode 104 but insulated. The common electrode 104 is a planar electrode, and the pixel electrode 105 is a comb-shaped electrode having a plurality of stripe-shaped electrodes.

Further, the pixel unit includes a plurality of thin film transistors (TFT) 103 disposed at the crossing of the scanning lines 101 and the data lines 102. The TFT 103 has a gate electrically connected to the scanning line 101, a source (or drain) electrically connected to the data line 102, and a drain (or source) electrically connected to the pixel electrode 105. In the pixel units shown in FIG. 1, the pixel electrodes 105, the common electrodes 104 and the data lines 102 are insulated from each other (the insulating layers are not show in FIG. 1). The pixel electrodes 105 are disposed on top of the common electrodes. 104. In the light transmitting direction, a black matrix having a plurality of black stripes (not shown in FIG. 1) is disposed on top of the scanning lines 101 and data lines 102. A plurality of color barriers are disposed among adjacent black stripes in the black matrix. Each color barrier corresponds to each pixel unit to display various colors.

However, the above FFS mode LCD panel may have a color shift problem. Due to the resolution limitation of photo-lithography machines, it is difficult to reduce the stripe-shaped electrode width and the gap between two adjacent stripe-shaped electrodes. The pixel unit have a limited width and, therefore, the stripe-shaped electrodes in one pixel unit may be very close to the stripe-shaped electrodes in the adjacent pixel units. When a voltage is applied to the stripe-shaped electrodes in one pixel unit, liquid crystal molecules in the adjacent pixel units may be also driven to rotate. If the adjacent pixel units display different colors, a color mixing may occur, which means a noticeable color shift in terms of visual effects.

FIG. 2 illustrates a top view of pixel units in another conventional FFS mode LCD panel. The pixel electrode 105 include one stripe-shaped electrode. Such a design may be less likely to have a color shift problem. However, under such design, the ability to drive the liquid crystal molecules may be reduced, and the transmittance of the LCD panel may be decreased accordingly.

The disclosed pixel unit array and liquid crystal display device thereof are directed to solve one or more problems in the art.

BRIEF SUMMARY OF THE DISCLOSURE

One aspect of the present disclosure provides a pixel unit array. The pixel unit array comprises a plurality of pixel units including a plurality of first pixel units and a plurality of second pixel units alternately arranged in a pixel direction. Each pixel unit comprises a first electrode, a second electrode and an insulating layer between the first electrode and the second electrode. The second electrode further includes a first part and a second part connected to the first part. The first part includes an N number of first stripe-shaped electrodes, and the second part includes an M number of second stripe-shaped electrodes. The first part in the second electrode has a width of a1, the second part in the second electrode has a width of a2, and a1<a2.

Another aspect of the present disclosure provides a liquid crystal display (LCD) device. The LCD device comprises a color film substrate, an array substrate arranged opposite to the color film substrate, and a liquid crystal layer sandwiched between the color film substrate and the array substrate. The array substrate comprises a pixel unit array comprising a plurality of pixel units. The plurality of pixel units further include a plurality of first pixel units and a plurality of second pixel units alternately arranged in a pixel direction. Each pixel unit comprises a first electrode, a second electrode and an insulating layer between the first electrode and the second electrode. The second electrode further includes a first part and a second part connected to the first part. The first part includes an N number of first stripe-shaped electrodes, and the second part includes an M number of second stripe-shaped electrodes. The first part in the second electrode has a width of a1, the second part in the second electrode has a width of a2, and a1<a2.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

Figure 1:
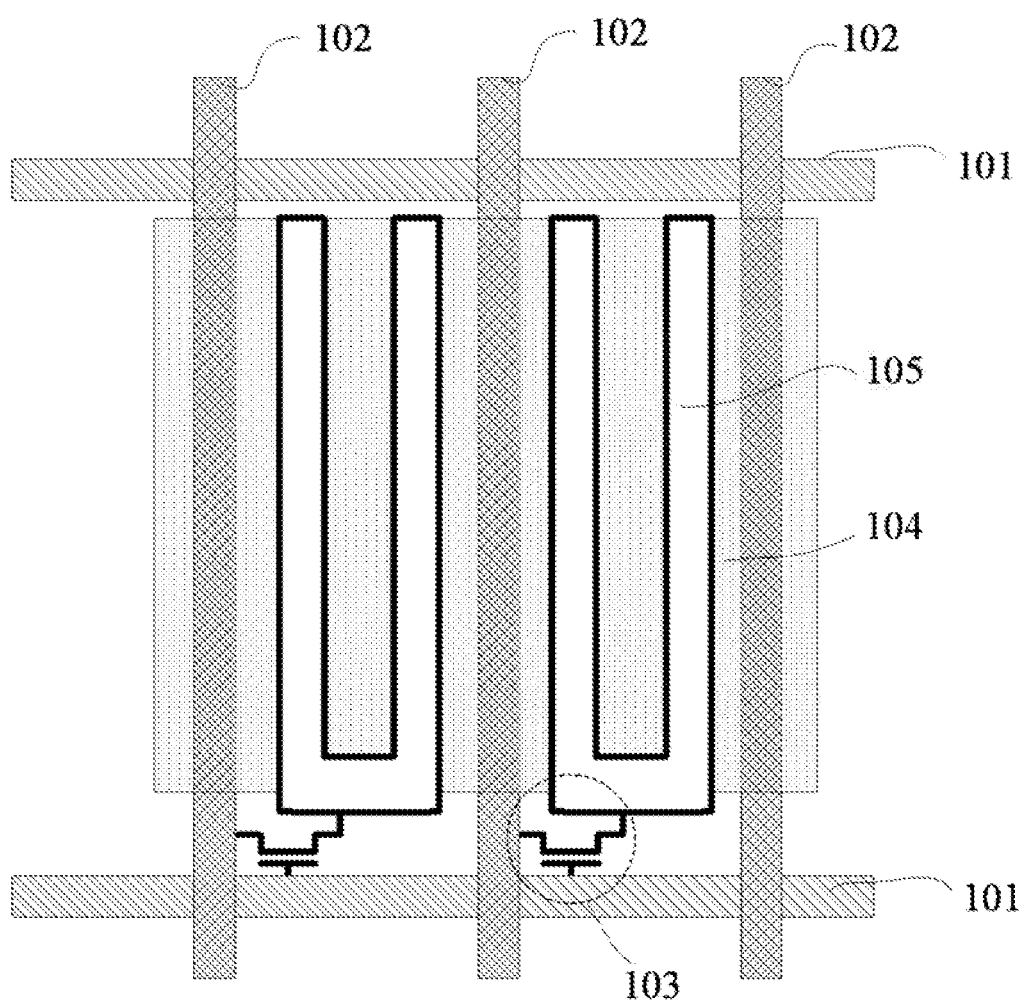
FIG. 1 illustrates a top view of pixel units in a conventional FFS type LCD panel.
Figure 2:
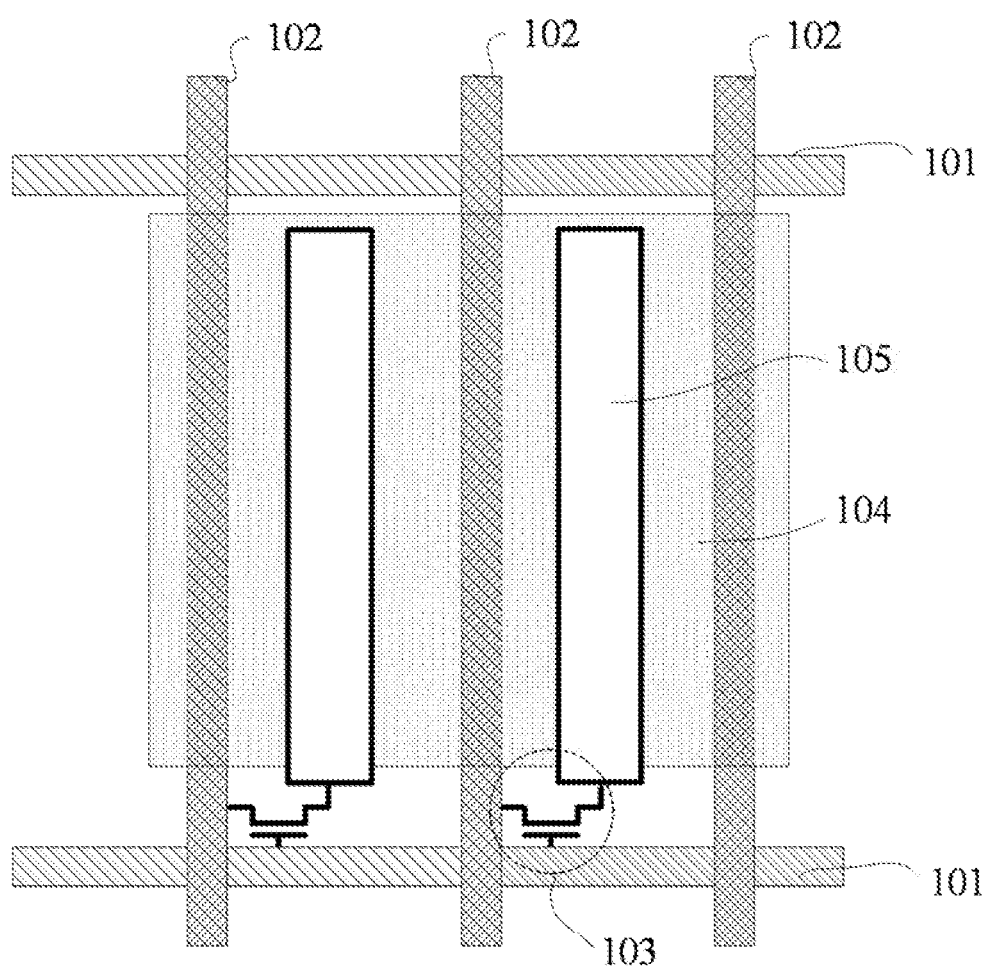
FIG. 2 illustrates a top view of pixel units in another conventional FFS type LCD panel.
Figure 3A:
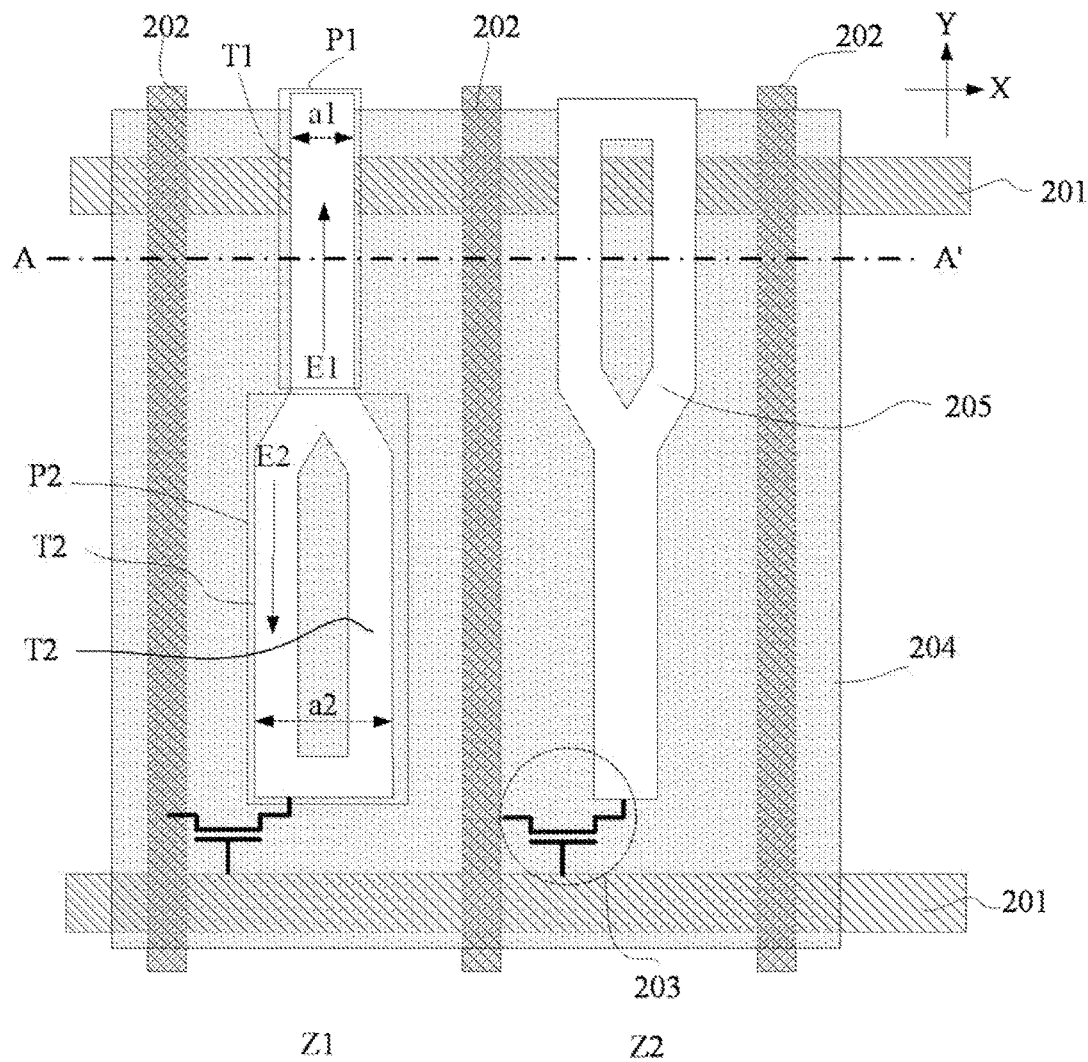
FIG. 3a illustrates a top view of an exemplary pixel unit array consistent with disclosed embodiments.
Figure 3B:
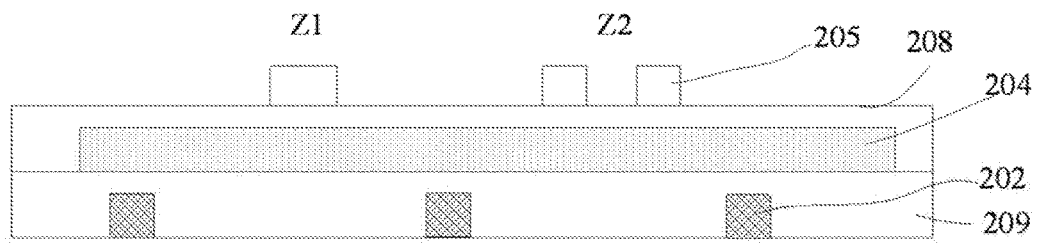
FIG. 3b illustrates an AA' sectional view of an exemplary pixel unit array in FIG. 3a consistent with disclosed embodiments.

FIG. 3a illustrates a top view of an exemplary pixel unit array consistent with disclosed embodiments. FIG. 3b illustrates an AA' sectional view of an exemplary pixel unit array in FIG. 3a consistent with disclosed embodiments. As shown in FIG. 3a and FIG. 3b, the pixel unit array may include a plurality of scanning lines 201 extending in an X direction, a plurality of data lines 202 extending in a Y direction, and an insulating layer 209 disposed between the plurality of scanning lines 201 and the plurality of the data lines 202. Further, the scanning lines 201 intersect or cross with the data lines 202, defining a plurality of pixel regions or pixels, which may be arranged in an array.

Each pixel unit may include a first electrode 204 and a second electrode 205. The first electrode 204 may be a planar electrode, and the first electrode of each pixel unit 204 may be connected together. The second electrode 205 may be a pixel electrode having stripe-shaped electrodes. A drain of a TFT switch 203 may be connected to the second electrode 205, a source of the TFT switch 203 may be connected to the data line 202, and a gate of the TFT switch 203 may be connected to the scanning line 201. Applying a common voltage to the first electrode 204 and a pixel voltage to the second electrode 205, a horizontal or fringe field electric field may be generated between the planar first electrode 204 and the stripe-shaped second electrode 205.

Further, the second electrode 205 may include a first part P1 and a connected second part P2. The first part P1 may include an N number of first stripe-shaped electrodes, and the second portion P2 may include an M number of second stripe-shaped electrodes. As shown in FIG. 3a and FIG. 3b, the first part P1 may include one stripe-shaped electrode T1, which may extend in a first direction E1 from the junction of the first part P1 and the second part P2. The second part P2 may include two stripe-shaped electrodes T2, which may extend in a second direction E2 from the junction of the first part P1 and the second part P2.

The first part P1 of the second electrode 205 may have a width of a1, i.e., the width of one stripe-shaped electrode is a1. The second part P2 of the second electrode 205 may have a width of a2, i.e., the width of the two stripe-shaped electrodes plus the gap between the two stripe-shaped electrodes is a2, particularly a1<a2.

The plurality of pixel units may include a plurality of first pixel units Z1 and a plurality of second pixel units Z2. The first pixel unit Z1 and the second pixel unit Z2 may be alternately arranged in the X direction. Further, in the X direction, the first part P1 in the first pixel unit Z1 may be adjacent to the second part P2 in the second pixel unit Z2, and the second part P2 in the first pixel unit Z1 may be adjacent to the first part P1 in the second pixel unit Z2.

In the first pixel unit Z1, because the width a1 of the first part P1 of the second electrode 205 may be small, the first part P1 of the second electrode 205 may be far away from the second pixel unit Z2. Therefore, the first part P1 of the second electrode 205 may not be able to drive the liquid crystal molecules in the adjacent second pixel unit Z2. When the first pixel unit Z1 is turned on, color shift may not occur on the both sides of the first part P1. Meanwhile, because the second part P2 of the second electrode 205 may have a large width a2 as well as the two stripe-shaped electrodes, the second part P2 may exhibit a high transmittance.

Similarly, in the second pixel unit Z2, the width a1 of the first part P1 in the second electrode P1 is small, the first part P1 of the second electrode 205 may be far away from the first pixel unit Z1. Therefore, the first part P1 of the second electrode 205 may not be able to drive the liquid crystal molecules in the adjacent first pixel unit Z1. Meanwhile, because the second part P2 of the second electrode 205 may have a large width a2 as well as the two stripe-shaped electrodes, the second part P2 may exhibit a high transmittance.

Both the first pixel unit Z1 and the second pixel unit Z2 may have the second part with a high transmittance and the first part free of color shift at the same time. Therefore, as a whole, the first part and the second part may compensate each other in displaying images. The noticeable color shift may be reduced or eliminated while the transmittance may be retained.

Figure 4:
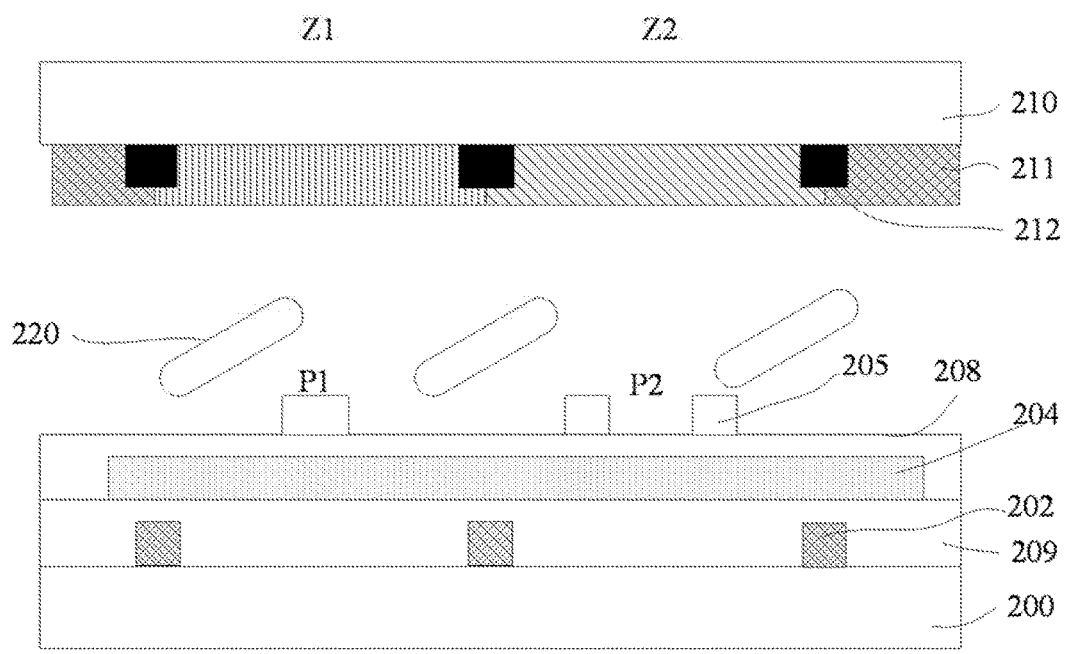
FIG. 4 illustrate a cross-sectional view of an exemplary LCD device consistent with disclosed embodiments.

Another aspect of the present disclosure provides a display device. FIG. 4 illustrate a cross-sectional view of an exemplary LCD device comprising a pixel unit array as shown in FIG. 3a and FIG. 3b consistent with disclosed embodiments. As shown in FIG. 4, the LCD device may include a color film substrate, an array substrate arranged opposite to the color film substrate, and a liquid crystal layer 220 sandwiched between the color film substrate and the array substrate.

Further, the array substrate may include a substrate 200 and the pixel unite array shown in FIG. 3a and FIG. 3b disposed on the substrate 200. The detail structure of the pixel unit array may be omitted here. The color film substrate may include a substrate 210, a plurality of first black-matrix stripes (not shown in FIG. 4) and a plurality of second black-matrix stripes 212. The plurality of first black-matrix stripes and the plurality of second black-matrix stripes 212 may be disposed on a surface of the substrate 210 facing the liquid crystal layer 220.

The plurality of the first black-matrix stripes may be set along an X direction. The plurality of the first black-matrix stripes may one-to-one correspond to the plurality of scanning lines 201 and, meanwhile, block the corresponding scanning lines 201 in the light transmitting direction. The plurality of the second black-matrix stripes 212 may be set along a Y direction. The plurality of the second black-matrix stripe may one-to-one correspond to the plurality of the data lines 202 and, meanwhile, block the corresponding data lines 202 in the light transmitting direction. The plurality of first black-matrix stripes intersecting or crossing the plurality of second black-matrix stripes 212 may confine a plurality of regions, in which color barriers 211 may be disposed. The color barriers 211 may correspond to the pixel units.

Because the LCD device may include the above mentioned pixel unit array, the noticeable color shift in displaying images may be reduced or eliminated while high transmittance may be maintained.

In the disclosed embodiment, for illustrative purposes, the second electrode 205 may be a stripe-shaped pixel electrode and the first electrode 204 may be a planar common electrode. In certain other embodiments, the second electrode may be a stripe-shaped common electrode while the first electrode may be a planar pixel electrode.

Figure 5A:
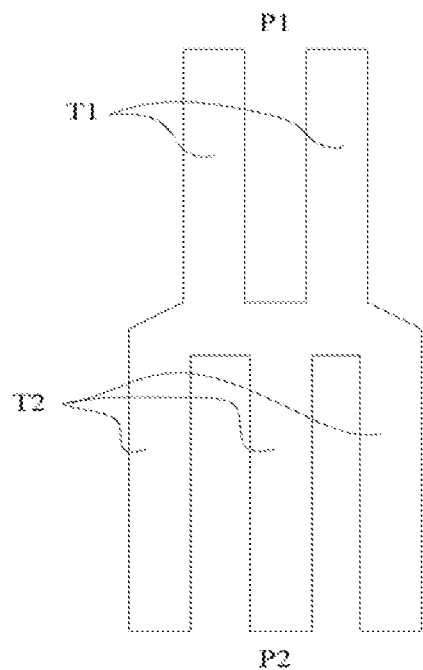
FIG. 5a illustrates a top view of an exemplary second electrode consistent with disclosed embodiments.
Figure 5B:
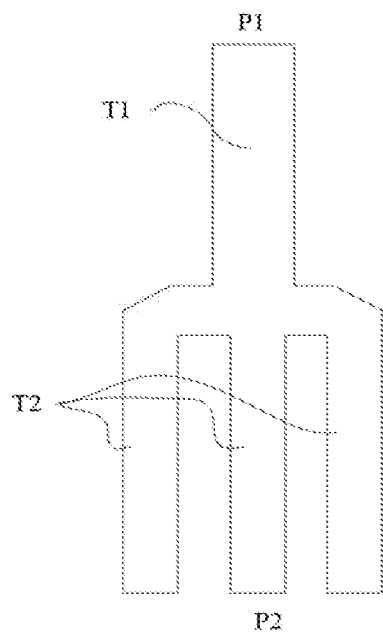
FIG. 5b illustrates a top view of another exemplary second electrode consistent with disclosed embodiments.

Further, in the disclosed embodiment, N=1 and M=2 are only for illustrative purposes. Depending on various pixel unit size and various display resolution, one pixel unit may include a various number of stripe-shaped electrodes. FIG. 5a and FIG. 5b illustrate two exemplary second electrodes having different numbers of stripe-shaped electrodes.

FIG. 5a illustrates a top view of an exemplary second electrode consistent with disclosed embodiments. As shown in FIG. 5a, N=2 and M=3. That is, a first part P1 may include two stripe-shaped electrodes T1, and a second part P2 may include three stripe-shaped electrodes T2.

FIG. 5b illustrates a top view of another exemplary second electrode consistent with disclosed embodiments. As shown in FIG. 5b, N=1 and M=3. That is, a first part P1 may include one stripe-shaped electrode T1, and a second part P2 may include three stripe-shaped electrodes T2.

In the disclosed embodiments, the first direction E1 and the positive direction of the Y axis may be the same, while the second direction E2 and the negative direction of the Y-axis direction may be the same. That is, an angle between the first direction E1 and the second direction E1 may be 180°. Thus, one pixel unit may only include one domain.

Figure 6:
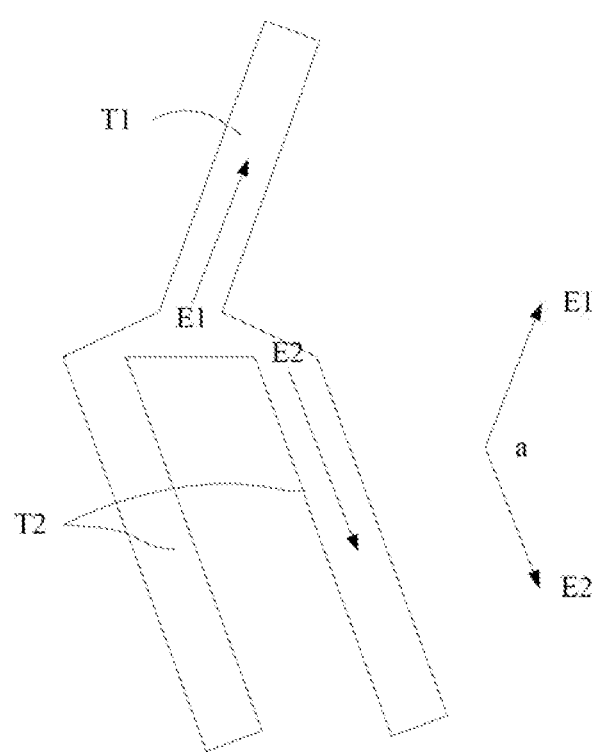
FIG. 6 illustrates a top view of another exemplary second electrode consistent with disclosed embodiments.

FIG. 6 illustrates a top view of another exemplary second electrode consistent with disclosed embodiments. As shown in FIG. 6, a first direction E1 may have an angle α with a second direction E2, particularly 0°<α<180°. Thus, one pixel unit may include two domains. A wider viewing angle and a better image displaying may be realized.

Figure 7A:
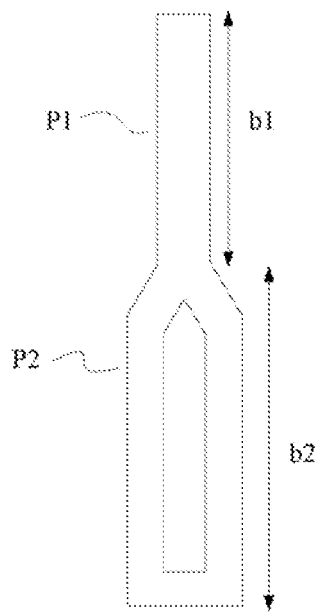
FIG. 7a illustrates a top view of an exemplary second electrode in an exemplary pixel unit in FIG. 3a consistent with disclosed embodiments.
Figure 7B:
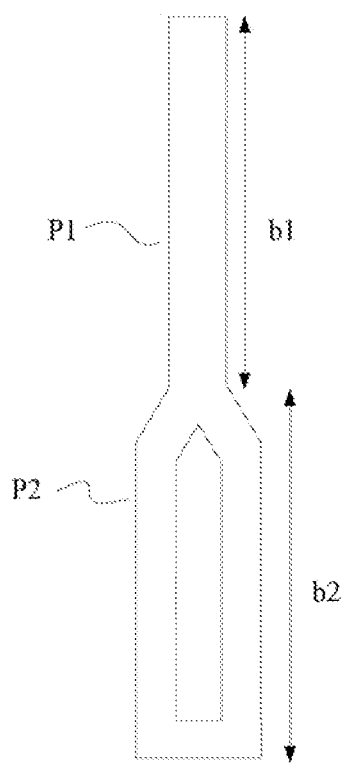
FIG. 7b illustrates a top view of another exemplary second electrode in an exemplary pixel unit in FIG. 3a consistent with disclosed embodiments.

FIG. 7a illustrates a top view of an exemplary second electrode in an exemplary pixel unit in FIG. 3a consistent with disclosed embodiments. As shown in FIG. 7a, the length b1 of a first-part P1 and the length b2 of a second part P2 may be different, particularly b2>b1. FIG. 7b illustrates a top view of another exemplary second electrode in an exemplary pixel unit in FIG. 3a consistent with disclosed embodiments. As shown in FIG. 7b, the length b1 of a first-part P1 and the length b2 of a second part P2 may be the same.

Figure 8:
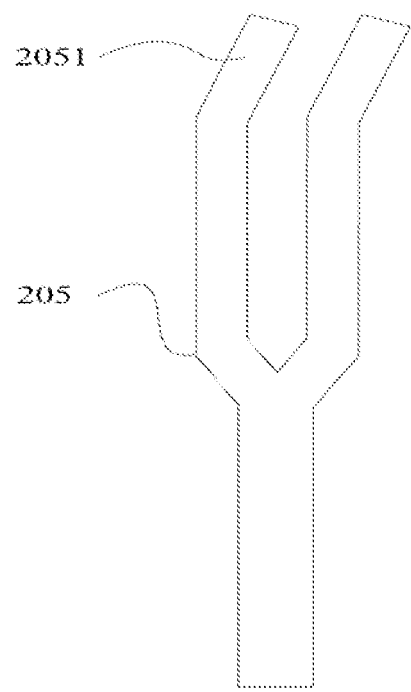
FIG. 8 illustrates a top view of another exemplary second electrode consistent with disclosed embodiments.

FIG. 8 illustrates a top view of another exemplary second electrode consistent with disclosed embodiments. As shown in FIG. 8, the second electrode 205 may further include a bending part 2051 away from a junction between a first part and a second part shown in FIG. 3a. The bending part 2051 may be located at an end of the first part, or an end of the second part. Such a design may reduce domain boundaries and increase pixel transmittance.

Figure 9A:
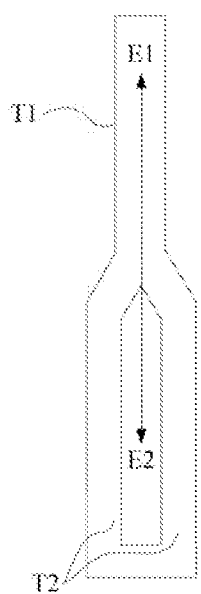
FIG. 9a illustrates a top view of another exemplary second electrode in an exemplary pixel unit in FIG. 3a consistent with disclosed embodiments.

FIG. 9a illustrates a top view of another exemplary second electrode in an exemplary pixel unit in FIG. 3a consistent with disclosed embodiments. As shown in FIG. 9a, an extending line from a first stripe-shaped electrode T1 to a second direction E2 may be located in the middle of two adjacent second stripe-shaped electrodes. That is, the second electrode may have a symmetric structure, and the second electrode may have an equal spacing from two adjacent pixel units.

Figure 9B:
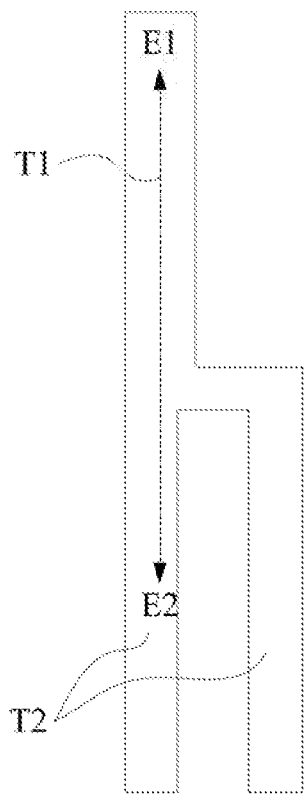
FIG. 9b illustrates a top view of another exemplary second electrode in an exemplary pixel unit in FIG. 3a consistent with disclosed embodiments.

In certain other embodiments, the second electrode may have an asymmetrical structure, as shown in FIG. 9b. FIG. 9b illustrates a top view of another exemplary second electrode in an exemplary pixel unit in FIG. 3a consistent with disclosed embodiments. As shown in FIG. 9b, an extending line from a first stripe-shaped electrode T1 to a second direction E2 may be closer to one second stripe-shaped electrode T2 while far away from another second stripe-shaped electrode T2.

Figure 10:
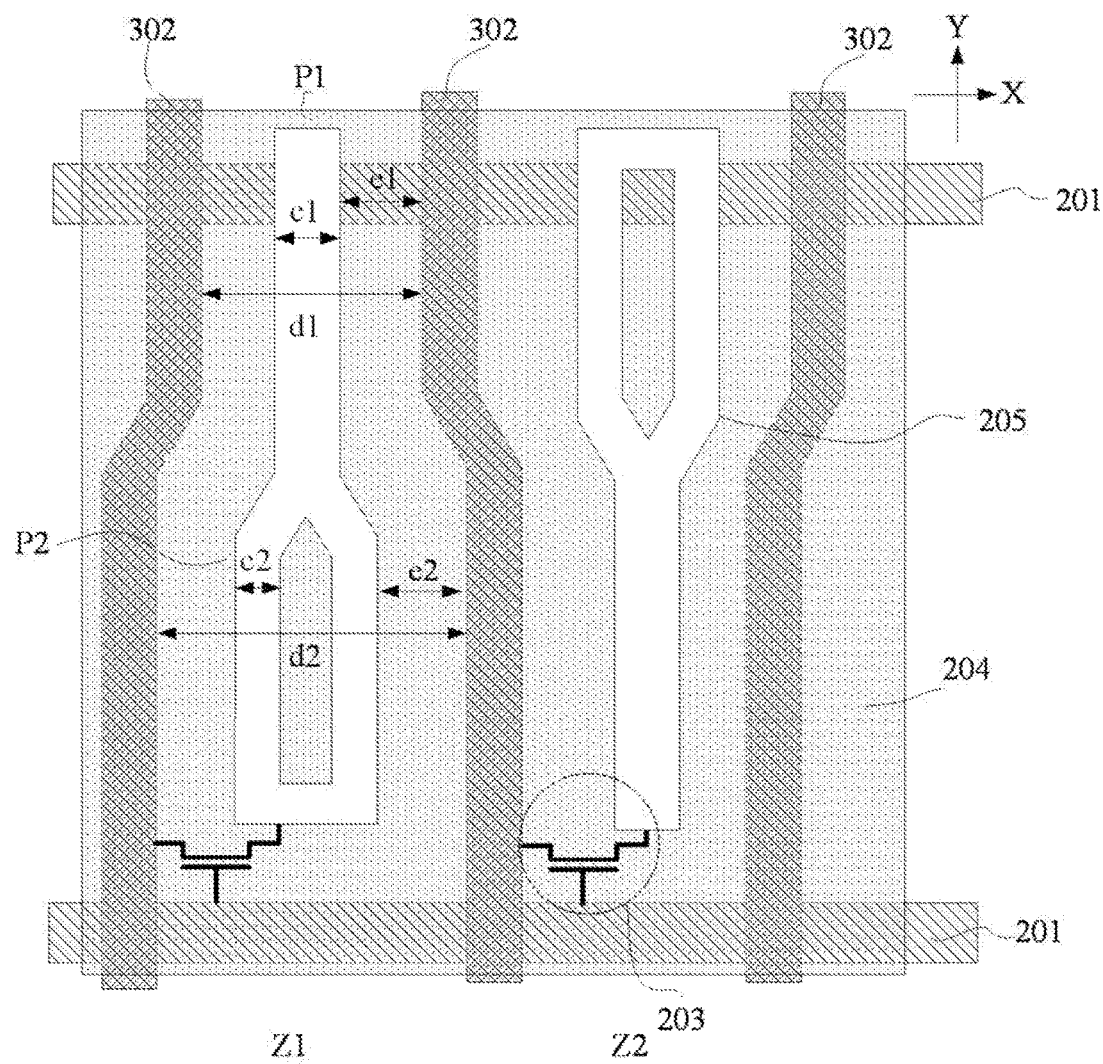
FIG. 10 illustrates a top view of another exemplary pixel unit array consistent with disclosed embodiments.

FIG. 10 illustrates a top view of another exemplary pixel unit array consistent with disclosed embodiments. Similarities between FIG. 10 and FIG. 3a may not be repeated here, while certain differences are further illustrated. As shown in FIG. 10, two adjacent data lines 302 may have a spacing of d1 in a first part P1, and two adjacent data lines 302 may have a spacing of d2 in a second part P2, particularly d1<d2.

Although the data lines 302 may extend along a Y direction, but the data lines 302 may not be straight lines. A segment of the data line 302 adjacent to the first part P1 may get close to a second electrode 205, while another segment of the data line 302 adjacent to the second part P2 may expand away from to the second electrode 205.

In the pixel units, a spacing between the second electrode 205 and the data line may be required to be sufficiently close to but still beyond the driving range of the second electrode 205. Therefore, when a voltage is applied to the second electrode 205, the generated electric field may not be able to rotate liquid crystal molecules in the adjacent pixel units. That is, a noticeable color shift may not be observed.

In one pixel unit, because the first part P1 may have a narrow width and the second part P2 may have a wide width. If the data line is straight, when the spacing between the first part P1 and the data line is approximately equal to the driving range of second electrode, the second part P2 may be too close to the data lines. As a result, the second part P2 may drive liquid crystal molecules in the adjacent pixel units and generate display defects.

As contrary, if the data line is straight, when the spacing between the second part P2 and the data line is approximately equal to the driving range of second electrode, the first part P1 may be beyond the driving range of second electrode. As a result, certain portion of the pixel unit may not be driven to display images, causing reduced transmittance. Thus, in the present embodiment, d1 may be designed to be smaller than d2 (d1<d2). Such a design may reduce the noticeable color shift while keep the transmittance. On the other hand, compact and small-size pixel units may be more suitable for realizing high resolution.

Referring to FIG. 10, a spacing between the first part P1 and the data line 302 is e1, which may be larger than or equal to the driving range of the first part P1. A spacing between the second part P2 and the data line 302 is e2, which may be larger than or equal to the driving range of the second part P2. The spacing e1 may be equal or unequal to e2. A width of one first stripe-shaped electrode is c1, and a width of the second stripe-shaped strip electrode is c2, particularly c1>c2 and e1>e2. Because of a wider width and a larger driving range of the first stripe-shaped electrode, the spacing between the first stripe-shaped electrode and the data lines may also need to be larger accordingly.

The width of the first stripe-shaped electrode c1 may be set as approximately 3.0 µm, the width of the second stripe-shaped electrodes c2 may be approximately 2.0 µm, a spacing between two adjacent second stripe-shaped electrodes may be approximately 2.5 µm, the spacing between the first part P1 and the data line 302 e1 may be approximately 2.6 µm and the spacing between the second part P2 and the data line 302 e2 may be approximately 2.55 µm. The pixel units with such dimensions may exhibit desired transmittance and may display images without color shift.

Figure 11:
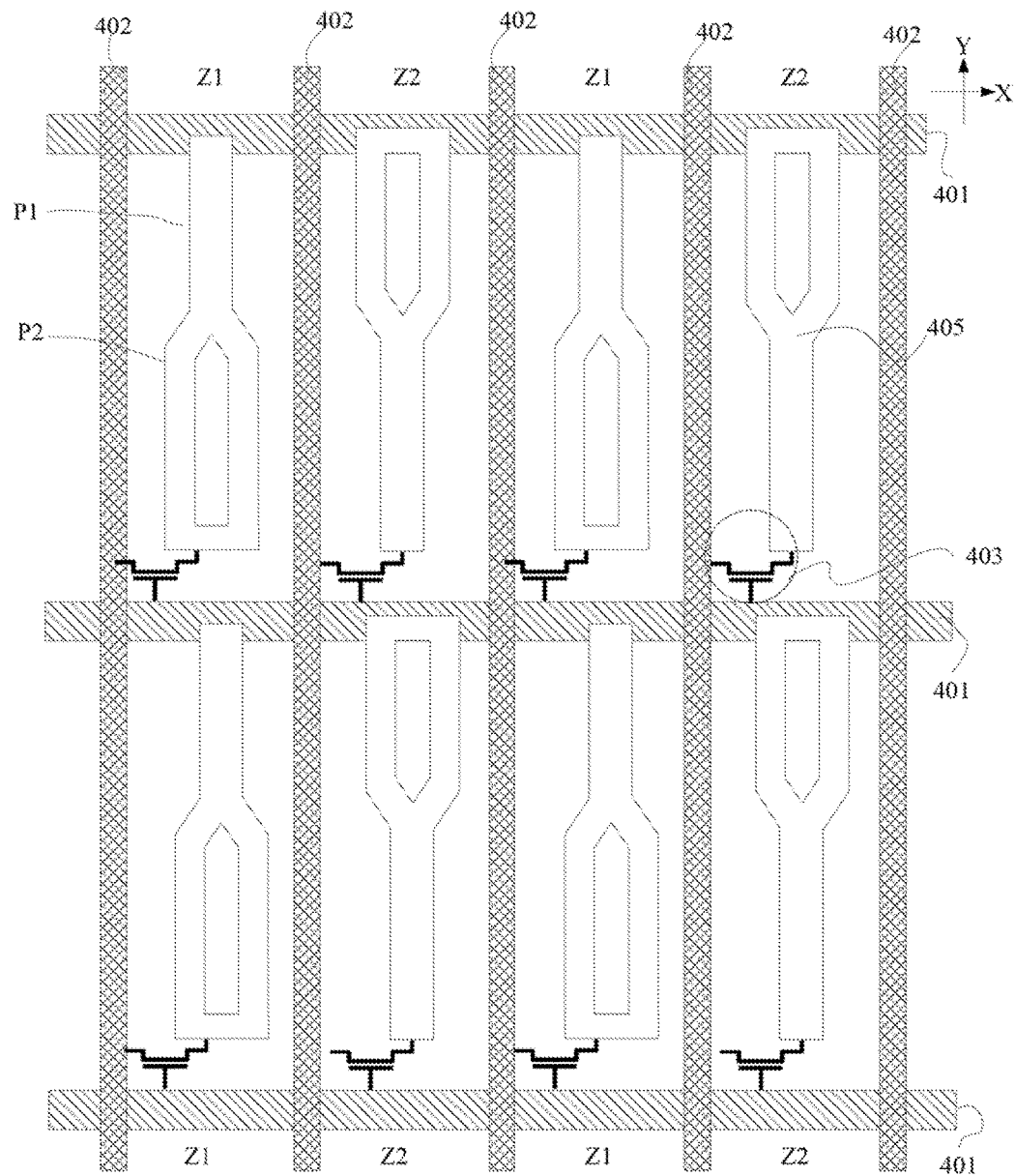
FIG. 11 illustrates a top view of another exemplary pixel unit array consistent with disclosed embodiments.

FIG. 11 illustrates a top view of another exemplary pixel unit array consistent with disclosed embodiments. As shown in FIG. 11, a pixel unit array may include a plurality of scanning lines 401 extending in an X direction. A row of pixel units may be disposed between every two adjacent two scanning lines 401, and the pixel units may include a plurality of first pixel units Z1 and a plurality of second pixel units Z2. Each first pixel unit Z1 and each second pixel unit Z2 in a same row may be connected to a same scanning line 401.

Specifically, each pixel unit may include a thin film transistor (TFT) 403, each TFT 403 in a same pixel unit row may have a gate connected to a same scanning line 401 and a drain connected to a different data line 402. A second part P2 in the first pixel unit Z1 may be connected the drain of the TFT 403, and a first-part P1 in the second pixel unit Z2 may be connected the drain of the TFT 403.

Figure 12:
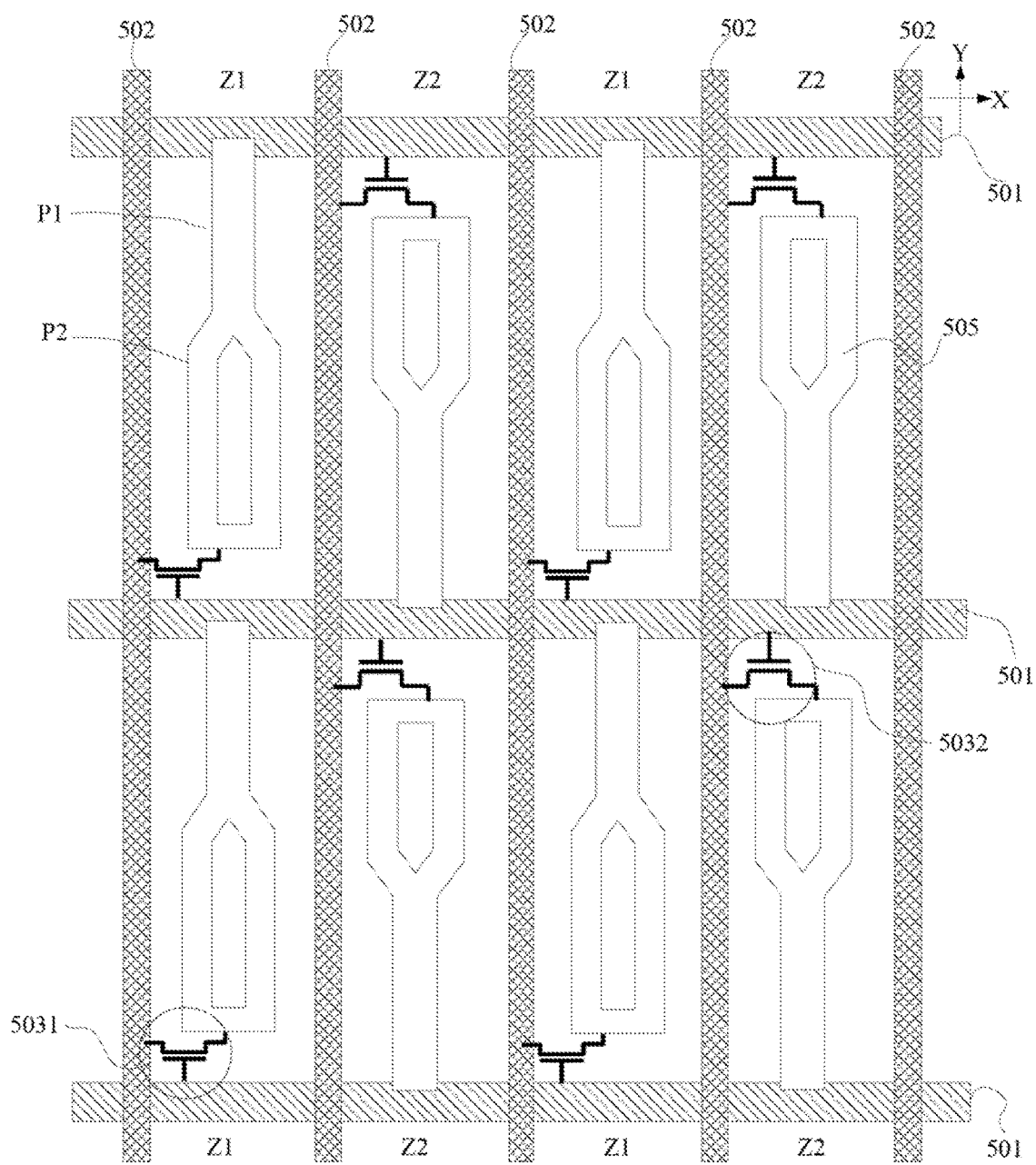
FIG. 12 illustrates a top view of another exemplary pixel unit array consistent with disclosed embodiments.

FIG. 12 illustrates a top view of another exemplary pixel unit array consistent with disclosed embodiments. Similarities between FIG. 11 and FIG. 12 may not be repeated here while certain differences are further illustrated. That is, in a row of pixel units, a plurality of first pixel units may be connected to a same scanning line, and a plurality of second pixel units may be connected to a same scanning line. However, the plurality of first pixel units and the plurality of second pixel units may be connect different scanning lines.

As shown in FIG. 12, each first pixel unit Z1 in a row of pixel units may be connected to a lower scanning line 501, and each second pixel unit Z2 may be connected to an upper scanning line 501. Specifically, each first pixel unit Z1 may include a first TFT switch 5031, and each second pixel unit Z2 may include a second TFT switch 5032. Each first TFT switch 5031 may be connected to the lower scanning line 501 and each second TFT 5032 may be connected to the upper scanning line 501. Further, each first TFT switch 5031 may be disposed to an end of the second part P2 in the first pixel unit Z1, which is away from the first part P1. Each second TFT switch 5032 may be disposed to an end of the second part P2 in the second pixel unit Z2, which is away from the first part P1.

Figure 13:
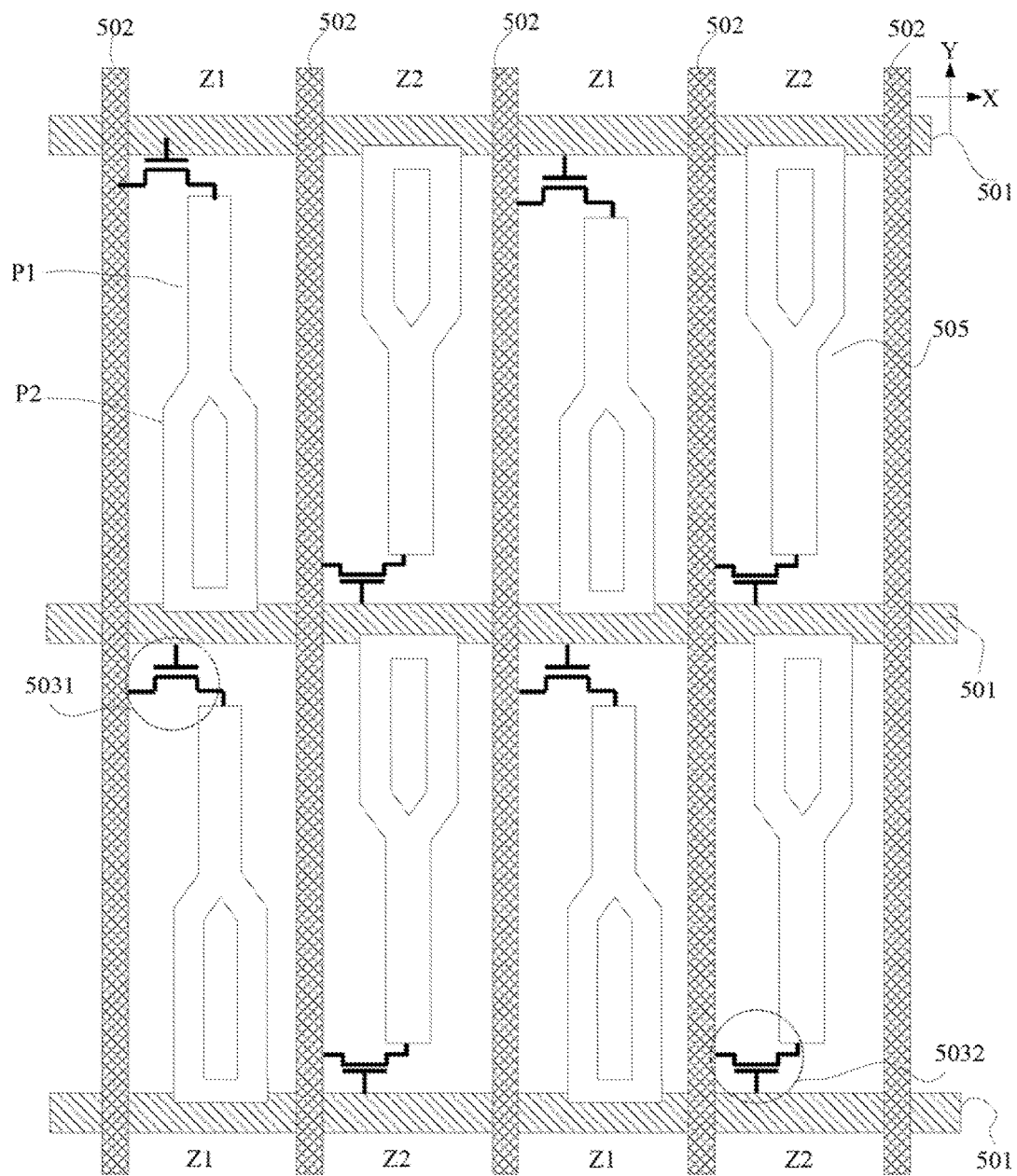
FIG. 13 illustrates a top view of another exemplary pixel unit array consistent with disclosed embodiments.

FIG. 13 illustrates a top view of another exemplary pixel unit array consistent with disclosed embodiments. As shown in FIG. 13, each first TFT switch 5031 may be disposed to an end of the first part P1 in the first pixel unit Z1, which is away from the second part P2. Each second TFT switch 5032 may be disposed to an end of the first part P1 in the second pixel unit Z2, which is away from the second part P2.

Another aspect of the present disclosure provides a LCD device including any of the above-mentioned pixel unit array consistent with disclosed embodiments. In particular, the LCD device may include a color film substrate and an array substrate arranged opposite to the color film substrate. A liquid crystal layer may be disposed between the color film substrate and the array substrate. The array substrate may include any above-mentioned pixel unit array consistent with disclosed embodiments. The liquid crystal layer may include negative liquid crystal materials having a better display performance.

Because one pixel unit may include a first part and a second part, the first part and the second part as a whole may compensate each other in displaying images. The pixel unit arrays and the LCD device may reduce or eliminate a noticeable color shift and, meanwhile keep high transmittance.

Other applications, advantages, alternations, modifications, or equivalents to the disclosed embodiments are obvious to those skilled in the art. It is intended that the specification and embodiments be considered as exemplary only, with a true scope and spirit of the invention being indicated by the claims.

What is claimed is:

1. A pixel unit array, comprising:
   a plurality of pixel units including a plurality of first pixel units and a plurality of second pixel units alternately arranged in a pixel direction,
   wherein:
   each pixel unit comprises a first electrode, a second electrode, and an insulating layer between the first electrode and the second electrode;
   the second electrode includes a first part and a second part connected to the first part;
   the first part includes an N number of first stripe-shaped electrodes, wherein N is an integer;
   the second part includes an M number of second stripe-shaped electrodes, wherein M is an integer, N and M are larger than or equal to 1, and M>N; and
   the first part in the second electrode has a width of a1 in the pixel direction, the second part in the second electrode has a width of a2 in the pixel direction, and a1<a2; and
   a plurality of data lines extending in a Y direction, wherein a spacing between two adjacent data lines in the first part is d1, a spacing between two adjacent data lines in the second part is d2, and d1<d2.

2. The pixel unit array according to claim 1, wherein:
   the first part of the second electrode in the first pixel unit and the second part of the second electrode in the second pixel unit are alternately arranged in the pixel direction; and
   the second part of the second electrode in the first pixel unit and the first part in the second electrode in the second pixel unit are alternately arranged in the pixel direction.

3. The pixel unit array according to claim 2, wherein:
the first part of the second electrode has a length of b1, the second part of the second electrode has a length of b2, and b1 is equal to b2.

4. The pixel unit array according to claim 1, wherein:
the N number of the first stripe-shaped electrodes in each pixel unit extend from a junction of the first part and the second part to a first direction; and
the M number of the second stripe-shaped electrodes in each pixel unit extend from the junction of the first part and the second part to a second direction.

5. The pixel unit array according to claim 4, wherein:
an extending line from the first stripe-shaped electrode to the second direction is located in the middle of two adjacent second stripe-shaped electrodes.

6. The pixel unit array according to claim 4, wherein:
the first direction has an angle α with the second direction, and 0°<α≤180°.

7. The pixel unit array according to claim 1, wherein:
N=1 and M=2.

8. The pixel unit array according to claim 7, wherein:
the first stripe-shaped electrode has a width of 3.0 µm;
the second stripe-shaped electrode has a width of 2.0 µm; and
two adjacent second stripe-shaped electrodes have a spacing of 2.5 µm.

9. The pixel unit array according to claim 1, wherein:
the first stripe-shaped electrode has a width of c1 in the pixel direction, the second stripe-shaped strip electrode has a width of c2 in the pixel direction, and c1≥c2.

10. The pixel unit array according to claim 1, wherein the pixel direction is an X direction, further including:
a plurality of scanning lines extending in the X direction, wherein in a row of pixel units, the plurality of the first pixel units and the plurality of the second pixel units are connected to a same scanning line.

11. A pixel unit array, comprising:
a plurality of pixel units including a plurality of first pixel units and a plurality of second pixel units alternately arranged in a pixel direction; and
a plurality of scanning lines extending in the pixel direction,
wherein:
each pixel unit comprises a first electrode, a second electrode and an insulating layer between the first electrode and the second electrode,
the second electrode includes a first part and a second part connected to the first part,
the first part includes an N number of first stripe-shaped electrodes, wherein N is an integer,
the second part includes an M number of second stripe-shaped electrodes, wherein M is an integer, N and M are larger than or equal to 1, and M>N,
the first part in the second electrode has a width of a1, the second part in the second electrode has a width of a2, and a1<a2,
the plurality of the first pixel units in a row of pixel units are connected to a same scanning line,
the plurality of the second pixel units in the row of pixel units are connected to a same scanning line, and
the plurality of the first pixel units in the row of pixel units and the plurality of the second pixel units in the row of pixel units are connected to different scanning lines.

12. The pixel unit array according to claim 11, wherein:
each first pixel unit includes a first thin-film-transistor (TFT) switch disposed to an end of the first part away from the second part; and
each second pixel unit includes a second TFT switch disposed to an end of the first part away from the second part.

13. The pixel unit array according to claim 11, wherein:
each first pixel unit includes a first TFT switch disposed to an end of the second part away from the first part; and
each second pixel unit includes a second TFT switch disposed to an end of the second part away from the first part.

14. A liquid crystal display (LCD) device, comprising:
a color film substrate;
an array substrate arranged opposite to the color film substrate, wherein the array substrate comprises a pixel unit array comprising:
a plurality of pixel units including a plurality of first pixel units and a plurality of second pixel units alternately arranged in a pixel direction, and a plurality of data lines extending in a Y direction, wherein:
each pixel unit comprises a first electrode, a second electrode and an insulating layer between the first electrode and the second electrode;
the second electrode includes a first part and a second part connected to the first part;
the first part includes an N number of first stripe-shaped electrodes, wherein N is an integer;
the second part includes an M number of second stripe-shaped electrodes, wherein M is an integer, N and M are larger than or equal to 1, and M>N;
the first part in the second electrode has a width of a1 in the pixel direction, the second part in the second electrode has a width of a2 in the pixel direction, and a1<a2; and
a spacing between the two adjacent data lines in the first part is d1, a spacing between the two adjacent data lines in the second part is d2, and d1<d2; and
a liquid crystal layer sandwiched between the color film substrate and the array substrate.

15. The LCD device according to claim 14, further including:
a plurality of first black-matrix stripes extending in an X direction formed on the color film substrate, wherein the plurality of first black-matrix stripes correspond to the plurality of scanning lines and block the plurality of scanning line; and
a plurality of second black-matrix stripes extending in a Y direction formed on the color film substrate, wherein the plurality of second black-matrix stripes correspond to the plurality of data lines and block the plurality of data lines.

16. The LCD device according to claim 14, wherein:
the liquid crystal layer includes negative liquid crystal materials.

17. The LCD device according to claim 14, wherein:
the first part of the second electrode in the first pixel unit and the second part of the second electrode in the second pixel unit are alternately arranged in the pixel direction; and
the second part of the second electrode in the first pixel unit and the first part in the second electrode in the second pixel unit are alternately arranged in the pixel direction.

18. The LCD device according to claim 14, wherein:
the N number of the first stripe-shaped electrodes in each pixel unit extend from a junction of the first part and the second part to a first direction; and the M number of the second stripe-shaped electrodes in each pixel unit extend from the junction of the first part and the second part to a second direction.

\* \* \* \* \*